April 1, 1947. E. V. MORLEY 2,418,313
PLAIN BEARING LUBRICATOR
Filed Nov. 4, 1944

INVENTOR.
EARL V. MORLEY
BY
ATTORNEYS

UNITED STATES PATENT OFFICE 2,418,313

PLAIN BEARING LUBRICATOR

Earle V. Morley, Oakland, Calif.

Application November 4, 1944, Serial No. 561,937

2 Claims. (Cl. 308—122)

The present invention relates to improvements in a plain bearing lubricator, and it consists of the combinations, constructions and arrangements hereinafter described and claimed:

An object of my invention is to provide a plain bearing lubricator in which the lubricant is forced through the plain bearing and around the shaft portion which is rotatably received in the bearing. In my co-pending application on a bearing lubricator, Serial No. 550,601, filed August 22, 1944, I show a roller or ball bearing mounted in a housing and lubricated by a force or vacuum feed. The present invention is designed to take care of a lubricator for plain bearings.

A further object of my invention is to provide a device of the type described which is simple in construction and durable and efficient for the purpose intended. Novel means is provided for lubricating the end of the shaft carried by the bearing and the peripheral portion of the shaft that is received in the plain bearing. The bearing is sealed and therefore can be used at any angle.

Other objects and advantages will appear in the following specification, and the novel features of the device will be particularly pointed out in the appended claims.

Figure 1:
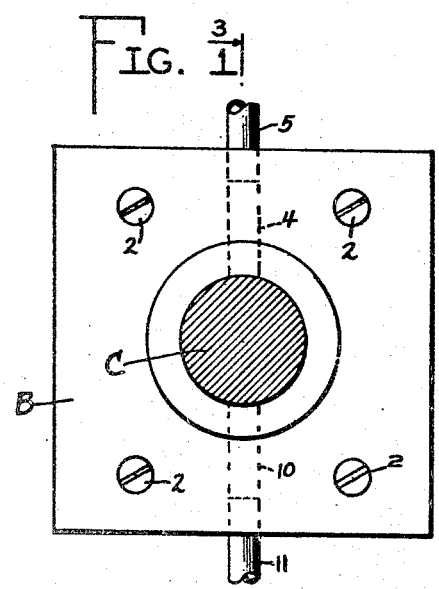
Figure 3:
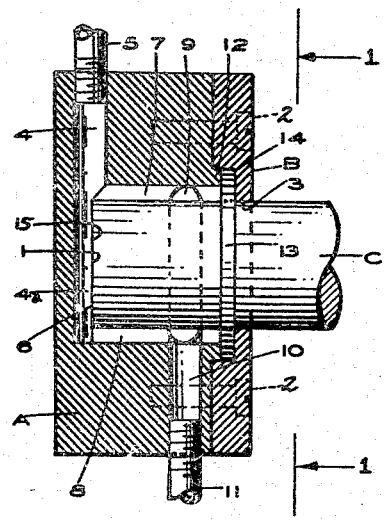
Figure 2:
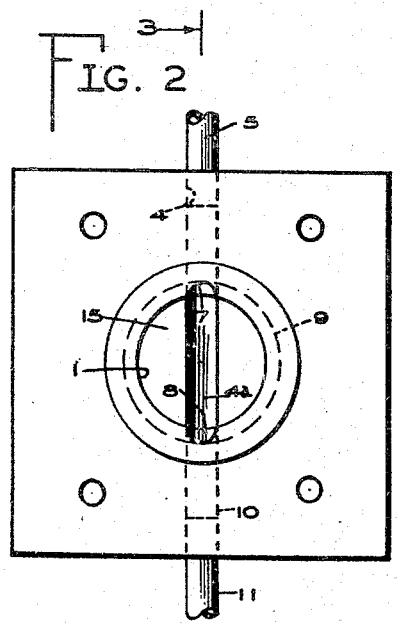

My invention is illustrated in the accompanying drawing forming a part of this application, in which Figure 1 is a section taken along the line 1—1 of Figure 3;

Figure 2 is a front elevation of the plain bearing with the cover plate removed; and Figure 3 is a vertical section taken along the line 3—3 of Figure 1.

While I have shown only the preferred forms of my invention, it should be understood that various changes or modifications may be made within the scope of the appended claims without departing from the spirit and scope of the invention.

In carrying out my invention I provide a plain bearing lubricator comprising a body member A and a cover plate B. The body A has a cylindrical bore 1 for receiving the end of the shaft C. The cover plate B is removably secured to the body by cap screws 2 and has an opening 3 for rotatably receiving the shaft.

The body A has a lubricant intake passage 4 and a pipe 5 conveys a lubricant to the passage. The passage 4 is cylindrical and has a threaded portion to receive the pipe 5. The passage 4 extends along the end of the bore at 4a and feeds the lubricant to the end of the shaft C. A transverse cross section of the extension passage 4a is in the shape of a half circle. The lubricant in the extension 4a extends diametrically across the end 6 of the shaft.

The lubricant-conveying passage 4 also communicates with a longitudinally extending passage or groove 7 that conveys the lubricant to the cylindrical surface of the shaft that is received in the bearing. The extension 4a communicates with a second or lower longitudinally extending passage or groove 8 that also applies the lubricant to the surface of the shaft C received in the bearing. Figure 3 shows an annular groove 9 that communicates with both passages or grooves 7 and 8 and is designed to convey the lubricant from these passages to an outlet passage 10 that in turn communicates with an outlet pipe 11. The outlet 10 has a threaded portion for receiving the outlet pipe.

Figure 3 also shows the body A provided with a flange 12 on the face that receives the cover plate and this flange encircles the bore 1. An oil-seal indicated generally at 13 bears against the rim of the flange 12 and is received in an annular recess 14 formed in the cover plate B. The recess wall keeps the oil seal in contact with the shaft and prevents any leakage of the lubricant through the opening 3.

From the foregoing description of the various parts of the device, the operation thereof may be readily understood.

The shaft C rotates in the plain bearing and a lubricant, such as oil, is conveyed to the bearing by the pipe 5 and is conveyed away from the bearing by the pipe 11. The lubricant flows along the upper lubricant channel or groove 7 and also along the back channel or groove 4a. The back channel 4a acts as a feeder for the lubricant to the lower channel 8. It will be seen that the end and the peripheral portion of the shaft received in the body A will be thoroughly lubricated. The annular channel 9 receives the lubricant from the channels 7 and 8 and delivers it to the outlet 10 and the pipe 11. Figure 2 shows the bore 1 as having an end wall 15 against which the shaft C abuts. This end wall has the groove 4a therein.

The plain bearing lubricator provides a continuous lubricant feed for the shaft portion rotatably mounted in the bearing. The bearing can be changed in form to suit different requirements. The bearing is sealed and therefore can be used at any angle. The continual flow of oil to and from the bearing prevents overheating and the consequent burning of any portion of the shaft or bearing due to too great a friction.

The bearing can be used in pumps, generators, automobiles, trucks, locomotives, tractors, aircraft, engines, marine power units, etc.

I claim:

1. A plain bearing having a body with a shaft receiving bore therein and a bottom wall for the bore, said body having a lubricant inlet passage, the bottom wall of the bore having a diametrically extending groove communicating with the passage, the cylindrical wall of the bore having diametrically opposed and longitudinally extending grooves communicating with the ends of the first-named groove and with the inlet, said body having an annular groove communicating with the longitudinally-extending grooves and being spaced from said first-named groove, said body also having an outlet passage communicating with the annular groove.

2. A plain bearing having a body with a shaft receiving bore therein and a bottom wall for the bore, said body having a lubricant inlet passage, the bottom wall of the bore having a diametrically extending groove communicating with the passage, the cylindrical wall of the bore having diametrically opposed and longitudinally extending grooves communicating with the ends of the first-named groove and with the inlet, said body having an annular groove communicating with the longitudinally-extending grooves and being spaced from said first-named grooves, said body also having an outlet passage communicating with the annular groove, an oil-seal ring placed at the entrance to the bore and designed to encircle the shaft rotatably mounted in the bore, and a cover plate secured to the body and having a recess for receiving the oil-seal ring.

EARLE V. MORLEY.

REFERENCES CITED

The following references are of record in the file of this patent:

UNITED STATES PATENTS

| Number | Name | Date |
|---|---|---|
| 525,338 | Corneliussen | Sept. 4, 1894 |
| 2,212,223 | Barnes | Aug. 20, 1940 |
| 1,745,425 | Johnson | Feb. 4, 1930 |
| 676,471 | Pessano | June 18, 1901 |
| 738,513 | Baker | Sept. 8, 1903 |
| 2,337,403 | Myers et al. | Dec. 21, 1943 |